United States Patent [19]

Sano et al.

[11] Patent Number: 4,835,714
[45] Date of Patent: May 30, 1989

[54] WHEEL ALIGNMENT CONTROL SYSTEM FOR VEHICLES

[75] Inventors: Shoichi Sano, Tokyo; Yoshimi Furukawa, Tochigi, both of Japan

[73] Assignee: Honda Giken Kogyo Kabushiki Kaisha, Tokyo, Japan

[21] Appl. No.: 142,309

[22] Filed: Dec. 29, 1987

Related U.S. Application Data

[63] Continuation of Ser. No. 711,977, Mar. 14, 1985, abandoned.

[30] Foreign Application Priority Data

Mar. 15, 1984 [JP] Japan .................. 59-49889
Mar. 15, 1984 [JP] Japan .................. 59-49890
Apr. 11, 1984 [JP] Japan .................. 59-72171

[51] Int. Cl.$^4$ .................. G01B 7/30; G01B 5/24
[52] U.S. Cl. .................. 364/551.01; 364/424.01; 280/661; 280/707; 33/288; 33/286
[58] Field of Search .............. 364/424.01, 425, 551.01, 364/559; 280/661, 707; 33/288, 286

[56] References Cited

U.S. PATENT DOCUMENTS

| | | | |
|---|---|---|---|
| 3,897,636 | 8/1975 | Leblanc | 33/203.13 |
| 4,143,970 | 3/1979 | Lill | 364/425 |
| 4,265,537 | 5/1981 | Hunter | 33/288 |
| 4,381,548 | 4/1983 | Grossman et al. | 364/559 |
| 4,383,370 | 5/1983 | Van Blerk et al. | 364/424 |
| 4,394,798 | 7/1983 | Beissbarth | 364/550 |

FOREIGN PATENT DOCUMENTS

| | | |
|---|---|---|
| 0001009 | 3/1979 | European Pat. Off. . |
| 3139792 | 4/1983 | Fed. Rep. of Germany . |
| 59-23716 | 2/1984 | Japan . |
| 59-67111 | 4/1984 | Japan . |

Primary Examiner—Parshotam S. Lall
Assistant Examiner—V. N. Trans
Attorney, Agent, or Firm—Irving M. Weiner; Joseph P. Carrier; Pamela S. Burt

[57] ABSTRACT

A wheel alignment control system for a vehicle having at least one pair of rear road wheels opposing each other in the transverse direction of the vehicle, for changing and setting a wheel alignment factor of the wheels in relation to a current speed of the vehicle. The wheel alignment factor to be set by the control system is a camber angle of the rear wheels, a static toeing angle of the rear wheels, or a dynamic toeing angle of the rear wheels. The dynamic toeing angle of changed to be set by changing a stroke characteristic of each of a pair of suspenion units respectively supporting the rear wheels, on which the stroke characteristic of an associated one of the suspension units exerts an effect such that, in accordance with a stroke length thereof, the toeing angle of a corresponding one of the rear wheels is varied.

15 Claims, 5 Drawing Sheets

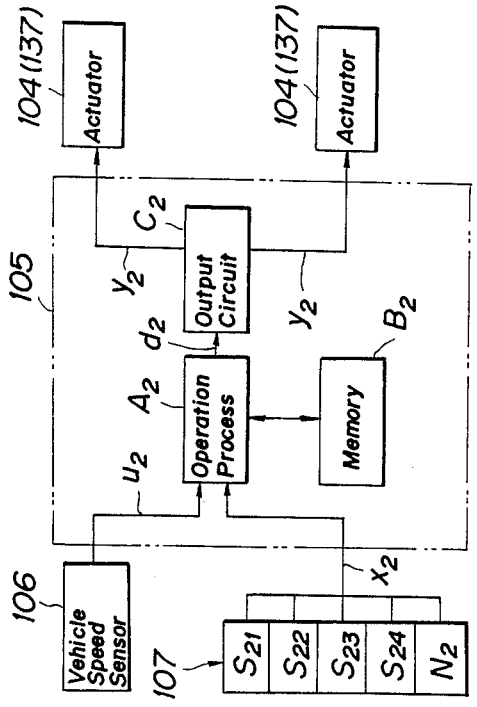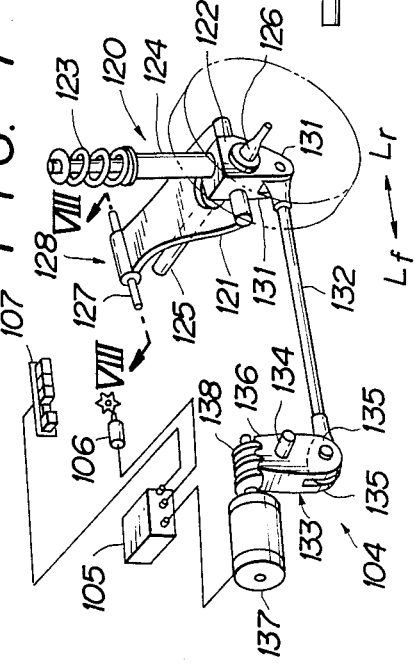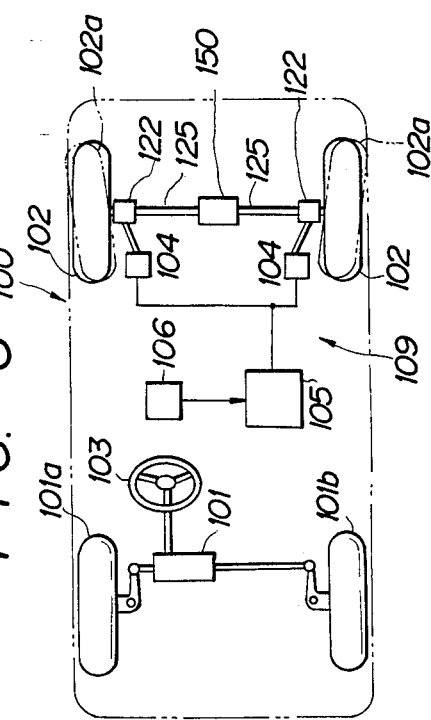

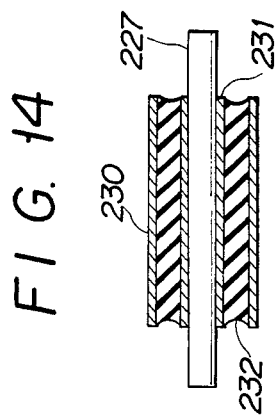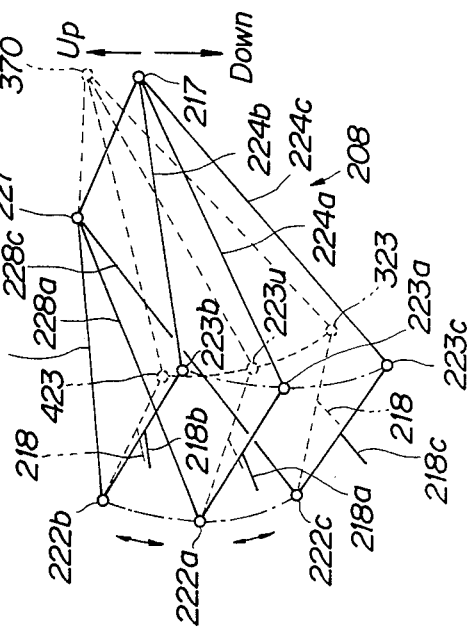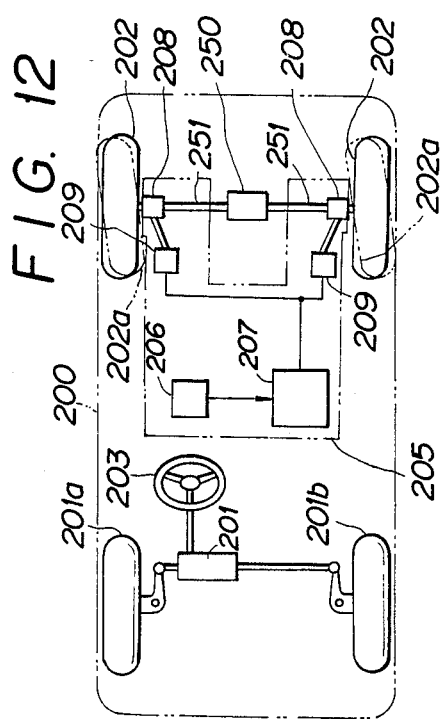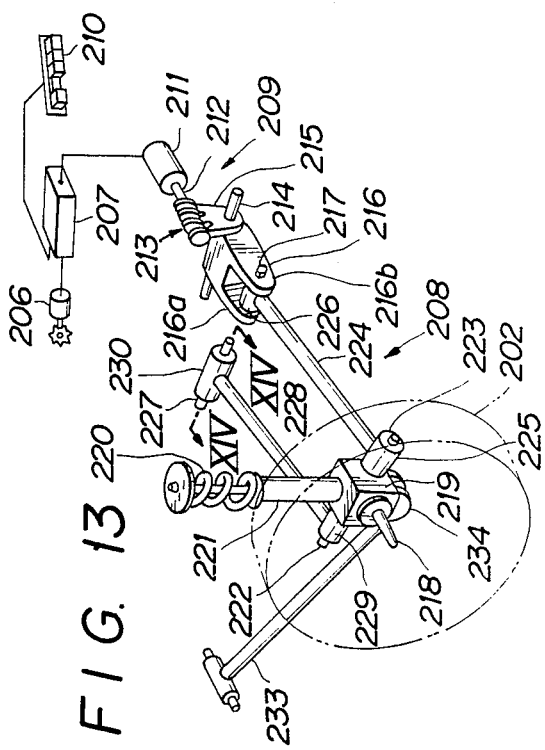

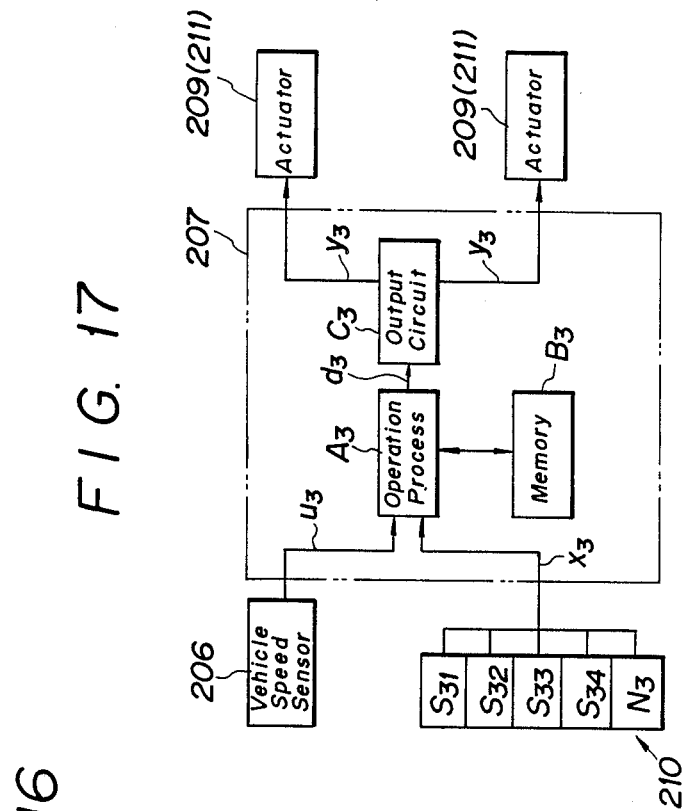
FIG. 17
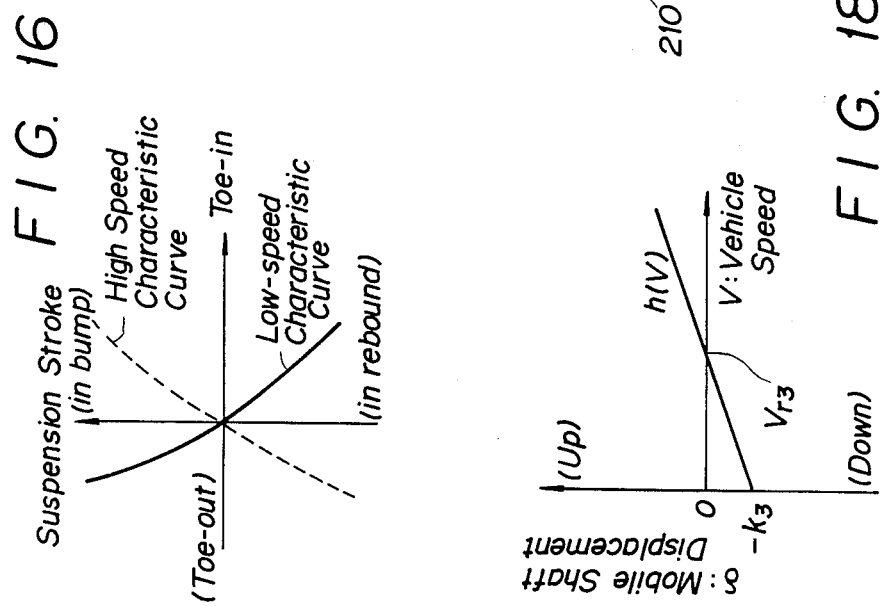
FIG. 16
FIG. 18

WHEEL ALIGNMENT CONTROL SYSTEM FOR VEHICLES

This is a continuation of application Ser. No. 711,977, filed Mar. 14, 1985, now abandoned.

BACKGROUND OF THE INVENTION

1. Field of the Invention

The present invention relates generally to a wheel alignment control system for vehicles, which controls a wheel alignment factor of the vehicle. More particularly, the invention relates to a wheel alignment control system for a vehicle having at least one pair of road wheels.

2. Description of Relevant Art

In general, in a vehicle having at least one pair of left and right road wheels, the wheels have a factor or factors of wheel alignment thereof preset to provide the vehicle with favorable travelling characteristics.

The term "wheel alignment" generally refers to the alignment of wheels and is usually used, in the art of vehicles of the type which have at least one pair of road wheels, as a term generically naming those angular relations which the wheels have relative to a body of such vehicle or the ground. Practically, the wheel alignment is represented by a number of well-known geometrical factors such as kingpin offset, kingpin inclination, trail, caster, camber, and toe-in.

Such factors will be briefly described below, as well as mutual relations thereamong and influences thereof on travel-related characteristics as of a vehicle in the art in concern, whereas for easy understanding such vehicle is assumed throughout the description to be standing still on a flat ground surface, with a steering wheel put in a neutral position thereof.

For each road wheel with a kingpin, the factor "kingpin offset" is defined as a distance on the ground surface in contact with a tire of the wheel, from the center of a grounded portion of the tire to the axial centerline of the kingpin, as it is viewed from ahead of a body of the vehicle; "kingpin inclination", an angle that, when viewed from ahead of the vehicle body, the axial centerline of the kingpin forms with the vertical; and "trail", a distance in the longitudinal direction of the vehicle body, between the center of the wheel and a point at which the axial centerline of the kingpin intersects with the ground surface. Each of these three factors depends on the geometrical arrangement of the kingpin and has an effect on the steering characteristic as well as on the force necessary for a driver to turn the steering wheel.

In this respect, the kingpin has a moment produced thereabout by longitudinal components of external forces acting on the grounded portion of the tire. Such moment becomes large, as the kingpin offset has a larger value, with the possibility of exerting a substantial influence on the steering characteristic. For such reason, there has been recent tendency to set the kingpin offset as small as possible.

The "caster" factor of the wheel alignment is defined, for each road wheel with a kingpin, as an inclination angle of the axial centerline of the kingpin as viewed from either side of the vehicle body. The caster is provided to set the aforesaid trail.

The "camber" factor of the wheel alignment is defined, for each road wheel, as a tilt angle that the center plane of the wheel as viewed from ahead of the vehicle body has with respect to a vertical plane extending in the longitudinal direction of the vehicle body, the vertical plane passing through the center of a grounded portion of a tire of the wheel, and assigned to have a positive value when, as viewed from the driver's position, the wheel is tilted outward from the vertical plane, and a negative value when the wheel is tilted inward therefrom.

Usually, the camber is set positive to minimize the kingpin offset. However, when set positive, the camber of any road wheel produces a force which tends to cause the wheel to roll out of the advance direction thereof while the vehicle is travelling, that is, what is called camber thrust.

To compensate for the camber thrust, each pair of such wheels as opposed to each other in the transverse direction of a vehicle are generally provided with the "toe-in" factor of the wheel alignment. For such paired wheels, the toe-in is defined as the difference of a distance b between the respective rear ends of the wheels as viewed from thereabove minus a distance a between the front ends thereof. In this respect, the wheels are said to be forced to toe in when the rear end distance b is larger than the front end distance a, and toe out when the distance b is smaller than the distance a.

In case, for a pair of road wheels, the camber is set negative, a camber thrust is exerted on each wheel in a direction opposite to that in the case of a positive camber angle, thus biasing the wheel inside of the advance direction thereof. In such case, the wheels should be forced to toe out, to thereby compensate for the camber thrust.

Moreover, for a pair of wheels forced to toe in or out, when representing the quantity of toe-in or toe-out by a toeing angle of the wheels to be positive or negative, respectively, it is known that the toeing angle varies in accordance with the compliance, that is, an elastic deformation of an associated suspension system, which variation accounts for a vehicle characteristic called compliance steer.

With respect to the foregoing description, in conventional vehicles of the type in question, the wheel alignment as well as the compliance characteristic of a suspension is preset to be substantially fixed, in spite of having essential effects on the steering characteristic.

Under certain conditions, however, for a vehicle of the type in question, it is desirable to set a pair of road wheels thereof for a negative camber angle, or in other words, to make each thereof tilted inward from the vertical plane, at vehicle speeds exceeding a predetermined value. For example, when the vehicle as thus set is turned around a corner, a limitation to the travelling characteristic thereof may be relaxed all the more for the camber angle to be then varied close to a zero degree.

To the contrary, as will be understood from the foregoing description, in case the camber angle is left set negative while the vehicle is travelling at extremely low speeds, the paired wheels may exert an interrepulsive thrust on each other to the extent that can result in an increase in the abrasion of tires as well as an increase of fuel cost.

Likewise, in a vehicle of the type in question, for stabilization of the travelling characteristic thereof at relatively high vehicle speeds it is desirable to set a pair of road wheels thereof for a relatively large toe-in quantity, which imparts to each wheel a tendency roll inside of the advance direction thereof, thus permitting the wheel to be aligned all the better in the advance direction at such vehicle speeds where the wheel itself is caused to slip out on a road surface to some extent. However, in case the toe-in quantity is left unchanged from such setting, an increased tire abrasion as well as an increase in fuel cost may result while the vehicle is travelling at extremely low speeds where the wheels seldom tend to slip out.

Incidentally, for a pair of road wheels of a vehicle in the art in question, it is also known that the toeing angle as well as a toeing direction thereof has a substantial effect on the steering characteristic of the vehicle. More particularly, it usually so follows to some extent that the vehicle tends to understeer when the wheels are forced to toe in, and to oversteer when they are forced to toe out.

In conventional vehicles in the art, the wheel alignment is likely to be preset so as to make the steering characteristic understeer to some extent, to thereby stabilize the travelling characteristic at relatively high vehicle speeds. In this respect, in a high-speed region, the travelling charactertistic becomes more stable, as the degree of understeer becomes stronger, whereas in a low-speed region, as this degree becomes weaker, the more the vehicle turnability will be facilitated. The understeering characteristic of the vehicle thus has a contradictory phase between high-speed and low-speed regions. For such reason, in the conventional vehicles, the degree of understeer is generally set to be moderate, that is, at a compromise point, without excessively inclining to the stronger side and without being biased to the weaker side. As a result, for such a vehicle having the degree of understeer thereof preset at such a compromise point, it is difficult to provide an optimum characteristic with respect to both the travelling stability in a high-speed region and the vehicle turnability in a low-speed region.

The present invention has been achieved to effectively overcome such shortcomings of a conventional vehicle.

SUMMARY OF THE INVENTION

According to the present invention, there is provided a wheel alignment control system for a vehicle having a pair of road wheels opposing each other in the transverse direction of the vehicle, for controlling a wheel alignment factor of the wheels, comprising a vehicle speed detecting means for detecting a vehicle speed of the vehicle, and a wheel alignment setting means adapted to cooperate with the vehicle speed detecting means to receive therefrom a vehicle speed data signal representing a current value of the vehicle speed, for thereby changing to set the wheel alignment factor in accordance with the current value of the vehicle speed.

In this respect, the road wheels may comprise a pair of rear wheels of the vehicle.

Moreover, the wheel alignment factor may comprise a camber angle of the rear wheels.

Further, the wheel aligment factor may comprise a static toeing quantity of the rear wheels.

Furthermore, the wheel alignment factor may comprise a dynamic toeing quantity of the rear wheels.

Accordingly, an object of the present invention is to provide a wheel alignment control system for a vehicle having at least one pair of transversely opposed road wheels, in which at least one wheel alignment factor of the wheels having a substantial effect on a traveling nature of the vehicle is permitted to be changed in a controlled manner, to thereby achieve an improved travelling characteristic.

Another object of the present invention is to provide a wheel alignment control system for such a vehicle, which permits the vehicle to be effectively upgraded in the travelling characteristic while turning.

Still another object of the present invention is to provide a wheel alignment control system for such a vehicle, which permits the vehicle to be effectively upgraded in the travelling characteristic in a high-speed region.

Yet another object of the present invention is to provide a wheel alignment control system for such a vehicle, which permits the vehicle to understeer in an optimized manner at any vehicle speed.

Tha above and further objects, details and advantages of the present invention will become apparent from the following detailed description of a number of preferred embodiments of the invention when read in conjunction with the accompanying drawings.

BRIEF DESCRIPTION OF THE DRAWINGS

FIG. 6 is a schematic plan view of a vehicle equipped with a wheel alignment control system according to a second embodiment of the invention.

FIG. 7 is an enlarged perspective partial view of the area surrounding a left rear wheel, including an essential part of the wheel alignment control system, of the vehicle of FIG. 6.

FIG. 8 is an enlarged longitudinal sectional view along line VIII—VIII of FIG. 7.

FIG. 9 is a functional block diagram of a control part of the wheel alignment control system according to the second embodiment.

FIG. 10 is a graph describing a control function of the control part of FIG. 9.

FIG. 12 is a schematic plan view of a vehicle equipped with a wheel alignment control system according to a third embodiment of the invention.

FIG. 13 is an enlarged perspective partial view of the area surrounding a left rear wheel and an associated suspension, including an essential part of the wheel alignment control system, of the vehicle of FIG. 12.

FIG. 14 is an enlarged longitudinal sectional view along line XIV—XIV of FIG. 13.

FIG. 15 is an enlarged perspective schematic view illustrating the compliance of the suspension of FIG. 13.

FIG. 16 is a graph showing a relation between the compliance of the suspension and the toeing of the rear wheel of FIG. 13.

FIG. 17 is a functional block diagram of a control part of the wheel alignment control system according to the third embodiment.

FIG. 18 is a graph depicting a control function of the control part of FIG. 17.

DETAILED DESCRIPTION OF THE PREFERRED EMBODIMENTS

Figure 1:
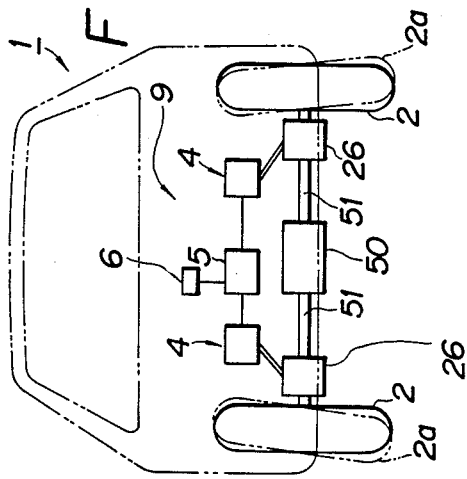
FIG. 1 is a schematic rear view of a vehicle equipped with a wheel alignment control system according to a first embodiment of the invention.

Referring first to FIG. 1, which is a rear view of a vehicle equipped with a wheel alignment control system according to the first embodiment of the present invention designated at reference numeral 1 is the entirety of the vehicle, and 9 is that of the wheel alignment control system.

The vehicle 1 has left and right driving rear wheels 2, 2 driven to revolve by left and right drive shafts 51, 51 operatively interconnected thereto through left and right axle support members 26, 26, respectively, the drive shafts 51, 51 extending leftwardly and rightwardly from differential 50 to which engine power is transmitted from an engine (not shown).

The left and right rear wheels 2, 2 are arranged to be operable with left and right actuators 4, 4, respectively, and each respectively adapted to be thereby outwardly and inwardly tiltable from the vertical, to be set for a proper camber angle. The left and right actuators 4, 4 are controlled with a control unit 5, to which is connected to vehicle speed sensor 6 for detecting a vehicle speed V of the vehicle 1, the vehicle speed V being signalized to be input as data to the control unit 5. With the actuators 4, the control unit 5, and the vehicle speed sensor 6, a substantial part of the wheel alignment control system 9 is constituted so as to change the camber of the rear wheels 2 in accordance with the vehicle speed V.

In FIG. 1, illustrated by chain line for each of the left and right rear wheels 2, 2 is a position 2a thereof, corresponding to one of the rear wheels 2 as tilted inward from the vertical to have a negative camber angle.

The wheel alignment control system 9 will be described in detail hereinbelow, with reference to FIGS. 2 to 4.

Figure 2:
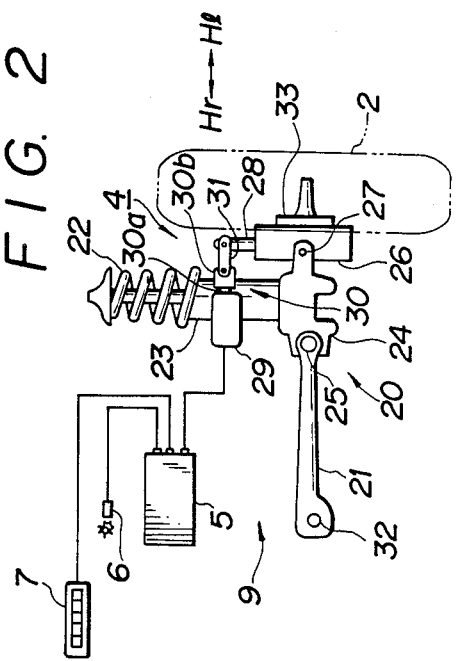
FIG. 2 is an enlarged partial front view of the area surrounding a left rear wheel, including an essential part of the wheel alignment control system, of the vehicle of FIG. 1.

FIG. 2 is a front view of a left rear suspension for the left rear wheel 2, showing a number of components of the wheel alignment control system 9. In FIG. 2, besides the vehicle speed sensor 6, a manual switch 7 is connected to the control unit 5 which comprises a later-described microcomputer system mounted on the vehicle, and the control unit 5 is connected to the left actuator 4 as well as to the right actuator (not shown). Including the left actuator 4, the entirety of the left rear suspension is designated by reference numeral 20.

The left rear suspension 20, which is of a Macferson strut type, further includes a left rear arm 21, and a left rear shock absorber 23 on which a coil spring 22 is fitted, the shock absorber 23 being pivotably supported at the transversely inner part of a bottom base portion 24 thereof by means of a longitudinally arranged pivot shaft 25 on the transversely outer end of the rear arm 21. On the transversely outer part of the base portion 24 of the shock absorber 23, the left axle support member 26 is pivotably supported by means of a longitudinally arranged pivot shaft 27. The axle support member 26 is adapted to rotatably support a left rear hub carrier 33 on which the left rear wheel 2 is mounted as shown by chain line in FIG. 2.

On the upper part of the axle support member 26, there is integrally formed a driven lever 28 projecting upwardly therefrom, on the one hand. On the other hand, as a component of the left actuator 4, a servo-motor unit 29 including a reduction gear (not shown) is fixed to a vehicle body (not shown), and an output shaft (not shown) thereof is coupled with a screw and nut mechanism 30 as another component of the left actuator 4. The mechanism 30 comprises a drive screw 30a integrally coupled with the output shaft of the servo-motor unit 29, and a driven ball nut 30b screwed on the screw 30a and interconnected with the driven lever 28 through a link 31, which link 31 is pivoted at one end thereof on the circumference of the ball nut 30b and at the other end thereof on the upper end of the driven lever 28.

In the foregoing arrangement, the left rear arm 21 is pivotably supported at the transversely inner end thereof through a longitudinally arranged pivot shaft 32 on the vehicle body; and the servo-motor unit 29 is electrically controlled by the control unit 5.

When the servo-motor unit 29 is caused to make a forward or reverse rotation, the ball nut 30b correspondingly moves in a direction of paired arrows Hl-Hr (to the left or right) in FIG. 2, whereby the driven lever 28 is forced together with the axle support member 26 to be angularly displaced clockwise or counterclockwise about the pivot shaft 27, thus giving rise to a corresponding variation in the camber of the left rear wheel 2. More definitely, when the ball nut 30b is caused to move in the direction of arrow Hr (to the right), a variation in the camber of the rear wheel 2 occurs in a direction toward the negative end thereof, thus forcing the rear wheel 2 inwardly of the vertical toward the position 2a of FIG. 1; and when the nut 30b is moved in the direction of arrow Hl (to the left), the camber of the rear wheel 2 changes toward the positive end thereof, with the rear wheel 2 forced outwardly of the vertical.

It is desirable that, relative to the foregoing and following descriptions of the arrangement and function about the left rear wheel, a mirror-imaged symmetry is unfailingly kept about the right rear wheel. As a matter of course, the right actuator 4 has an arrangement and function similar to those of the left actuator 4.

There will be described hereinbelow the function of the wheel alignment control system 9 in conjunction with FIGS. 3 and 4.

Figure 3:
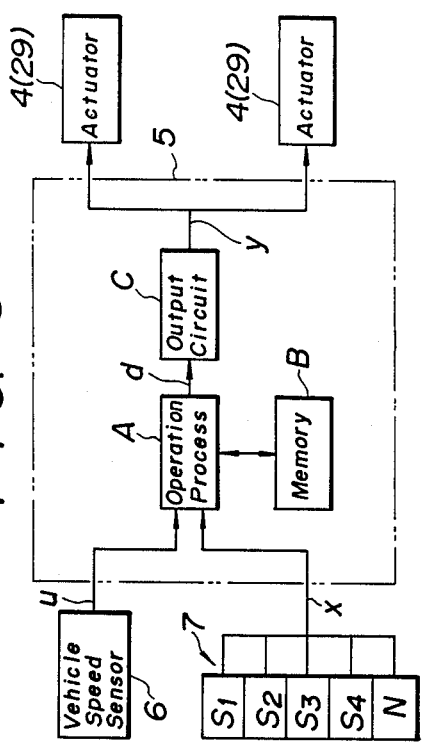
FIG. 3 is a functional block diagram of a control part of the wheel alignment control system according to the first embodiment.

As shown in FIG. 3, the control unit 5, which comprises the microcomputer system mounted on the vehicle 1 as already described, has input therein from the vehicle speed sensor 6 a vehicle speed data signal u representing the vehicle speed V. The signal u is processed through an operation process A to obtain a camber control data signal d representing control data including a camber angle $\theta$ for which the camber of the rear wheels 2 is controlled to be set, whereas the camber angle $\theta$ depends on a given function f of the vehicle speed V as a variant of the function f has a set of values in one-to-one correspondence with various values of the vehicle speed V, which values of the camber angle $\theta$ are empirically predetermimed to be optimum and stored as function data in a memory B, so as to be read out during the process A.

In this respect, the camber angle $\theta$ may be directly computed by processing the vehicle speed data signal u through a programmed routine.

Figure 4:
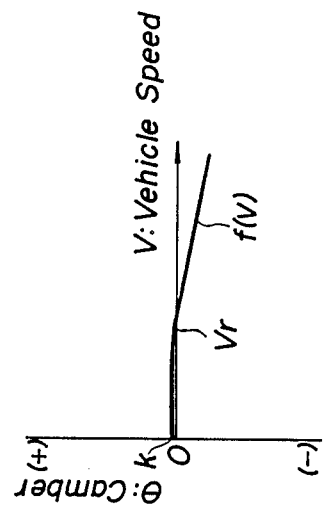
FIG. 4 is a graph describing a control function of the control part of FIG. 3.

FIG. 4 is a plot of the function f describing a relation between the camber angle θ and the vehicle speed V.

As can be seen from FIG. 4, according to the function f, for an arbitrary value of the vehicle speed V not exceeding a reference value Vr thereof, the camber angle θ is set equal to a positive constant k close to zero, and for those values of the vehicle speed V exceeding the reference value Vr, the camber angle θ has a linearly decreasing value as the vehicle speed V increases. In other words, the function f is so set that, in a region of V not exceeding Vr, f(V) is kept equal to the constant k and, in a region of V exceeding Vr, it becomes $-CV+(k+CVr)$, where C is a constant. As a result, the camber angle θ set as f(V) takes, in the region of V exceeding Vr, a negative value, so that in such region the left rear wheel 2 as well as the right rear wheel is tilted inward from the vertical, whereby the vehicle 1 is successfully upgraded in the travellng characteristic while turning.

Incidentaly, instead of the function f, there may be employed a selectively determined function in accordance with empirical data of individual vehicles.

Referring again to FIG. 3, the manual switch 7 provided for the control unit 5 comprises five control mode select buttons Si (where suffix "i" represents an arbitrary numeral between and including 1 to 4) and N each respectively adapted to, when manually operated to be selected, exclusively turn on. The result of mode selection at the switch 7 is informed in the form of a select operation signal x therefrom to the operation process A of the control unit 5.

When the button N of the manual swtich 7 is selected to be one, the control unit 5 is put in an automatic mode in which the camber control data signal d is automatically given in accordance with the vehicle speed V through the function f.

On the other hand, when any of the remaining four buttons Si of the switch 7 is selected to be on, the control unit 5 enters a manual mode in which the camber control data signal d has a corresponing fixed content irrespective of the vehicle speed V. More particularly, in the manual mode, the camber angle θ becomes fixed at the positive constant k, zero, a first predetermined negative value, or a second predetermined negative value smaller than the first negative value, when the button S1, S2, S3, or S4 is selected, respectively. In this respect, as an example, the button S1 may preferably be selected to be on to fix the camber angle θ at the positive constant k in such a case that the vehicle 1 travels at high speeds for a long time along a road extending substantially staight over a considerably long distance.

As shown in FIG. 3, the camber control data signal d as given by the operation process A enters an output circuit C, where it is subjected to necessary processes, such as a digital to analog conversion and an amplification, to be output from the control unit 5 in the form of a control signal y to the servo-motor unit 29 of the left actuator 4, as well as to a like unit of the right actuator. At the servo-motor unit 29, an unshown motor is caused to rotate in accordance with the control signal y, thereby forcing the driven lever 28 to tilt in the direction of arrow Hr or Hl of FIG. 2, thus giving rise to a corresponding variation in the camber of the rear wheel 2.

Incidentally, the microcomputer system constituting the control unit 5 comprises a microcomputer provided with necessary integrated circuits (not shown) to exhibit described functions, such as a CPU, a ROM, a RAM, and peripheral interfaces. Respective processes in the computer are executed following a control program software stored in the ROM. In this respect, in place of the computer, there may be employed an electric circuit with compatible functions.

Figure 5:
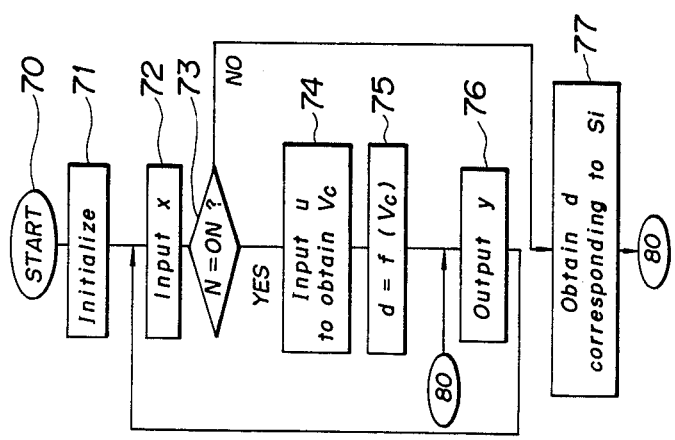
FIG. 5 is a schematic flow chart of a software program for a microcomputer system in the control part of FIG. 3.

FIG. 5 shows a schematic flow chart of a control program stored in the ROM of the computer.

The program is designed to start functioning upon a power-on operation or when reset at a stage 70, and makes the initialization of the peripheral interfaces as well as the setting of necessary variants at a stage 71, before the program flow enters a main loop consisting of a plurality of stages 72 to 77.

In the main loop, the select operation signal x from the manual switch 7 is input at the first stage 72 and, at a subsequent decision stage 73, a judgment is made according to the signal x about whether or not the automatic mode select button N is selected to be on.

When the bottom N is on, at a stage 74, the vehicle speed data signal u representing a current value Vc of the vehicle speed V is input from the vehicle speed sensor 6, and at a subsequent stage 75, the camber control data signal d is obtained by applying the function f to determine the camber angle θ in accordance with the current value Vc of the vehicle speed V.

Then, the program flow enters a stage 76, where the control signal y corresponding to the thus obtained content of the data signal d is output to the actuators 4, thereby controlling the camber of the rear wheels 2 as circumstances require. Thereafter, the flow again goes to the first stage 72.

However, when, at the decision stage 73, it is judged that the automatic mode select button N is not selected to be on, that is, one of the manual mode select buttons Si is selected, then the program flow enters the stage 77, where the camber control data signal d is obtained by fixing the camber angle θ at one of the aforementioned values thereof in accordance with particular selection of the buttons Si, before the flow goes to the stage 76.

In the foregoing description, to achieve a camber angle according to the control signal y as currently given, when each of the rear wheels 2 has been tilted actually from a certain camber angle to the angle to be finally achieved, then the rear wheel 2 is usually steered slightly from the initial certain angle. In this respect, although it is required to compare the final angle according to the signal y with an angle before then, in this embodiment such a process is covered with an internal electric circuit (not shown) in the servo-motor unit 29 of the actuator 4.

Further, the left and right actuators 4, 4 individually provided for the left and right rear wheels 2, 2 may preferably be modified into a single unit having a linkage for transmitting a mechanical output therefrom to the left and right rear wheels 2, 2.

As will be understood from the foregoing description, according to the first embodiment of the invention, the wheel alignment control system 9 of the vehicle 1 makes the camber of the rear wheels 2 properly changed to be controlled in accordance with the vehicle speed V as detected, thus permitting the camber to be optimum for various vehicle speeds ranging from an extremely low speed to a relatively high speed, so that the travelling characteristic of the vehicle 1 can be effectively upgraded for various vehicle speeds, particularly when turning while travelling at high speeds.

There will be described hereinbelow a wheel alignment control system for vehicles according to the second embodiment of the invention, with reference to FIGS. 6 to 11.

Referring first to FIG. 6, which is a schematic plan view of a vehicle equipped with the wheel alignment control system according to the second embodiment, designated at reference numeral 100 is the entirety of the vehicle, and 109 is that of the wheel alignment control system.

The vehicle 100 includes a gearbox 101 disposed in the front part thereof, for operatively interconnecting a steering wheel 103 with right and left front wheels 101a, 101b to be turned in accordance with a steering operation of the steering wheel 103 by a driver (not shown).

The vehicle 100 further has left and right driving rear wheels 102, 102 driven to revolve by left and right drive shafts 125, 125 operatively interconnected thereto through left and right axle support members 122, 122, respectively, the drive shafts 125, 125 leftwardly and rightwardly extending from a differential 150 to which engine power is transmitted from an engine (not shown).

The left and right rear wheels 102, 102 are arranged to be operable with left and right actuators 104, 104, respectively, and each is respectively adapted to be thereby turnable, to be forced to properly toe in or out. The left and right actuators 104, 104 are controlled with a control unit 105, to wiich is connected a vehicle speed sensor 106 for detecting a vehicle speed V of the vehicle 100, the vehicle speed V being signalized to be input as data to the control unit 105.

With the actuators 104, the control unit 105, and the vehicle speed sensor 106, a substantial part of the wheel alignment control system 109 is constituted so as to change a toeing quantity of the rear wheels 102 in accordance with the vehicle speed V.

In FIG. 6, illustrated by chain line for each of the left and right rear wheels 102, 102 is a position 102a thereof, in which a corresponding one of the rear wheels 102 is forced to toe in.

The wheel alignment control system 109 will be described hereinbelow in detail, with reference to FIGS. 7 to 11.

FIG. 7 is a perspective view of the left actuator 104 and a left rear suspension for the left rear wheel 102, showing a number of components of the wheel alignment control system 109. In FIG. 7, besides the vehicle speed sensor 106, a manual switch 107 is connected to the control unit 105 which comprises a later-described microcomputer system mounted on the vehicle, and the control unit 105 is connected to the left actuator 104 as well as to the right actuator (not shown). The entirety of the left rear suspension is designated by reference numeral 120.

The left rear suspension 120, which is of a Macferson strut type, includes a left rear arm 121 having at the transversely outer end thereof an axle support member 122 pivotably supported thereon by means of a longitudinally arranged pivot shaft, and a vertically arranged left rear shock absorber 124 on which a coil spring 123 is fitted, the shock absorber 124 being fixed at the lower end thereof onto the top of the axle support member 122. The transversely extending left drive shaft 125 is rotatably provided at the outer end part thereof through the middle part of the axle support member 122, and has at the outermost end thereof a rear hub carrier 126 integrally attached thereto to support the left rear wheel 102.

The rear arm 121 is pivotably supported at the transversely inner end thereof by means of a pivotal support mechanism 128 which includes a longitudinally arranged pivot shaft 127 fixed to a body (not shown) of the vehicle 100. More particularly, as shown in FIG. 8, the support mechanism 128 comprises the pivot shaft 127, a cylindrical elastic member 129 fitted on the pivot shaft 127, the elastic member 129 being made of rubber, and a bearing part 130 fitted on the elastic member 129, the bearing part 130 constituting a transversely inner end portion of the rear arm 121. With the support mechanism 128, the rear arm 121 is adapted to be not only vertically swingable about the pivot shaft 127 but also horizontally rockable due to the elasticity of the member 129.

In the lower part of the axle support member 122 there are formed integrally therewith a pair of downwardly projecting brackets 131, 131 transversely spaced apart from each other, and between the brackets 131 a longitudinally extending radius rod 132 is pivotably supported at the rear end thereof, on the one hand. On the other hand, the left actuator 104 includes a vertically arranged sector gear 133 pivotably supported at the vertically intermediate part thereof by means of a transversely arranged pivot shaft 134 fixed to the vehicle body, the sector gear 133 having in the upper part thereof a toothed gear portion 136 and in the lower part thereof a pair of downwardly projecting brackets 135, 135 integrally formed therewith so as to be transversely spaced apart from each other, which brackets 135 cooperate with each other to pivotably support therebetween the front end of the radius rod 132.

Moreover, as a component of the left actuator 104, a longitudinally arranged servo-motor unit 137 including an unshown reduction gear is fixed to the vehicle body, and on an output shaft (not shown) thereof a worm gear 138 is fixedly fitted, the work gear 138 being meshed with the gear portion 136 of the sector gear 133. The servo-motor unit 137 is electrically controlled by the control unit 105.

In the foregoing arrangmenet, when the worm gear 138 of the servo-motor unit 137 is driven to make a forward or reverse rotation, the radius rod 132 correspondingly moves in a direction of paired arrows Lf-Lr (forwardly or rearwardly) in FIG. 7, whereby the rear arm 121 is angularly displaced about a substantially vertical line passing through a longitudinally central point of the pivot shaft 127, while drawing at the transversely outer end thereof an arcuate trace, thus forcing the rear wheel 102, which is supported by the rear hub carrier 126 integrally attached to the transversely outermost end of the drive shaft 125, to correspondingly toe in or out. More specifically, when the radius rod 132 is caused to move in the direction of arrow Lf (forwardly), a toeing angle of the rear wheel 102 varies in a direction toward the toe-in end thereof, thus turning the rear wheel 102 toward the position 102a of FIG. 6; and when the rod 132 is moved in the direction of arrow Lr (rearwardly), the toeing angle of the wheel 102 changes toward the toe-out end thereof.

It is desirable that, relative to the foregoing and following descriptions of arrangement and function about the left rear wheel, a mirror-imaged symmetry is unfailingly kept about the right rear wheel. As a matter of course, the right actuator 104 has an arrangement and function similar to those of the left actuator 104.

There will be described hereinbelow the function of the wheel alignment control system 109 in conjunction with FIGS. 9 and 10.

As shown in FIG. 9, the control unit 105, which comprises the microcomputer system mounted on the vehicle 100 as already described, has input therein from the vehicle speed sensor 106 a vehicle speed data signal u2 representing the vehicle speed V. The signal u2 is processed through an operation process A2 to obtain a toeing control data signal d2 representing control data including a toe-out dimension a −b or negative toe-in dimension −(b−a) for which the toeing of the rear wheels 102 is controlled to be set, whereas the dimension a−b depends on a given function g of the vehicle speed V as a variant, such that $a-b=g(V)$. Incidentally, in the above description, the reference character a represents a distance between the respective front ends of the left and right wheels 102 as viewed from thereabove, and b, a distance between the respective rear ends thereof, as already described. The dimension a−b as a dependent variable of the function g has a set of values in one-to-one correspondence with various values of the vehicle speed V, which values of the dimension a−b are empirically predetermined to be optimum and stored as function data in a memory B2, so as to be read out during the process A2.

In this respect, the dimension a−b may be directly computed by processing the vehicle speed data signal u2 through a programmed routine.

FIG. 10 is a plot of the function g describing a relation between the toe-out dimension a−b and the vehicle speed V.

As can be seen from FIG. 10, for an arbitrary value of the vehicle speed V, the function g is set as a linear function $g(V) = -(k2/Vr2)V + k2$, where k2 is a positive constant, and Vr2 is a reference value of the vehicle speed V. In other words, the function g is so set that, in a domain of V in close vicinity to zero, the dimension a−b approaches the positive constant k2, thus forcing the rear wheels 102 to toe out, and in the remaining region of V, makes a monotone linear decrease with increase in the vehicle speed V, thus passing in the way a point of a−b=0 at the reference value Vr2, then entering a negative toe-out region, that is, a positive toe-in region, where the rear wheels 102 are forced to toe in. Thereafter, for the rear wheels 102, the degree of toe-in becomes larger, as the vehicle speed V becomes higher.

According to this embodiment, for the possibility of such toeing variation in accordance with the vehicle speed V, the vehicle 100 is successfully upgraded in the travelling characteristic in a high-speed region, in addition to that a reduction in the abrasion of tires as well as an improved fuel cost saving is achieved in a low-speed region.

Incidentally, instead of the function g, there may be employed a voluntary function in accordance with empirical data of individual vehicles.

Referring again to FIG. 9, the manual switch 107 provided for the control unit 105 comprises five control mode select buttons S2i (where suffix "i" represents an arbitrary numeral between and including 1 to 4) and N2 each respectively adapted to, when manually operated to be selected, exclusively turn on. The result of mode selection at the switch 107 is informed in the form of a select operation signal x2 therefrom to the operation process A2 of the control unit 105.

When the button N2 of the manual switch 107 is selected to be on, the control unit 105 is put in an automatic mode in which the toeing control data signal d2 is automatically given in accordance with the vehicle speed V through the function g.

On the other hand, when any of the remaining four buttons S2i of the switch 107 is selected to be on, the control unit 105 enters a manual mode in which the toeing control data signal d2 has a corresponding fixed content irrespective of the vehicle speed V. More particularly, in the manual mode, the dimension a−b becomes fixed at the positive constant k2 (positive toe-out), zero, a first predetermined negative value (positive toe-in), or a second predetermined negative value (positive toe-in) smaller than the first negative value, when the button S21, S22, S23, or S24 is selected, respectively. In this respect, as an example, the button S24 may preferably be selected to be on to fix the dimension a−b at the second positive toe-in value in such a case that the vehicle 100 travels at high speeds for a long time along a superhighway, to thereby lighten the burden on the wheel alignment control system 109, particularly that on the servo-motor unit 137.

As shown in FIG. 9, the toeing control data signal d2 as given by the operation process A2 enters an output circuit C2, where it is subjected to necessary processes, such as a digital to analog conversion and an amplification, to be output from the control unit 105 in the form of a control signal y2 to the servo-motor unit 137 of the left actuator 104, as well as to a like unit of the right actuator. At the servo-motor unit 137, an unshown motor is caused to rotate in accordance with the control signal y2, thereby causing the radius rod 132 to move in the direction of arrow Lf or Lr of FIG. 7, thus correspondingly forcing the rear wheels 102 to toe in or out in a controlled manner.

Incidentally, like the first embodiment, the microcomputer system constituting the control unit 105 comprises a microcomputer provided with necessary integrated circuits (not shown) to exhibit described functions. Respective processes in the computer are executed following a control program software stored in an ROM. In this respect, in place of the computer, there may be employed an electric circuit with compatible functions.

Figure 11:
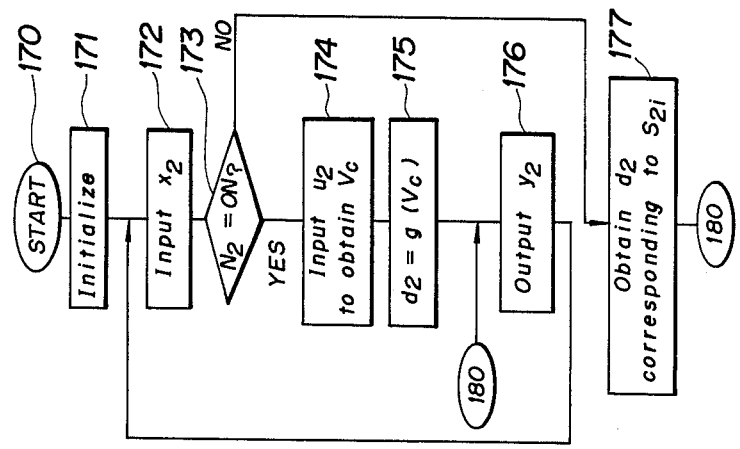
FIG. 11 is a schematic flowchart of a software program for a microcomputer system in the control part of FIG. 9.

FIG. 11 shows a schematic flow chart of a control program stored in the ROM of the computer.

The program is designed to start functioning upon a power-on operation or when reset at a stage 170, and makes the initialization of peripheral interfaces as well as the setting of necessary variants at a stage 171, before the program flow enters a main loop consisting of a plurality of stages 172 to 177.

In the main loop, the select operation signal x2 from the manual switch 107 is input at the first stage 172 and, at a subsequent decision stage 173, a judgment is made according to the signal x2 about whether or not the automatic mode select button N2 is selected to be on.

When the botton N2 is on, at a stage 174, the vehicle speed data signal u2 representing a current value Vc of the vehicle sped V is input from the vehicle speed sensor 106, and at a subsequent stage 175, the toeing control data signal d2 is obtained by applying the function g to determine the dimension a−b in accordance with the current value Vc of the vehicle speed V.

Then, the program flow enters a stage 176, where the control signal y2 corresponding to the thus obtained content of the data signal d2 is output to the actuators 104, thereby controlling the toeing of the rear wheels 102 as circumstances require. Thereafter, the flow again goes to the first stage 172.

However, when, at the decision stage 173, it is judged that the automatic mode select button N2 is not selected to be one, that is, one of the manual mode select buttons S2i is selected, then the program flow enters the stage 177, where the toeing control data signal d2 is obtained by fixing the dimension a−b at one of the aforementioned values thereof in accordance with particular selection of the buttons S2i, before the flow goes to the stage 176.

In the foregoing second embodiment also, although it is required to make a comparison between a toeing quantity to be finally achieved according to the signal y2 and a toeing quantity before then, such a process is covered with an internal electric circuit (not shown) in the servo-motor unit 137 of the actuator 104.

As will be understood from the foregoing description, according to the second embodiment of the invention, the wheel alignment control system 109 of the vehicle 100 makes the toeing of the rear wheels 102 properly changed to be controlled in accordance with the vehicle speed V a detected, thus permitting the toeing to be optimum for various vehicle speeds ranging from an extremely low speed to a relatively high speed, so that the travelling characteristic of the vehicle 100 can be effectively upgraded for various vehicle speeds.

It will also be understood that the above-described second embodiment may be applied to the front wheels 101a, 101b of the vehicle 100.

There will be described hereinbelow a wheel alignment control system for vehicles according to the third embodiment of the invention, with reference to FIGS. 12 to 19.

Referring first to FIG. 12, which is a schematic plan view of a vehicle equipped with the wheel alignment control system according to the third embodiment, designated at reference numeral 200 is the entirety of the vehicle, and 205 is that of the wheel alignment control system.

Like in the foregoing embodiments, the vehicle 200 includes a front gearbox 201, right and left front wheels 201a, 201b, right and left driving rear wheels 202, 202, a steering wheel 203, a differential 250, and right and left drive shafts 251, 151.

Each of the rear wheels 202 has a toeing angle thereof controlled in a later-described manner with the wheel alignment control system 205. The control system 205 comprises a vehicle speed sensor 106 for detecting a vehicle speed V of the vehicle 200, and a control unit 207 adapted to cooperate with the vehicle speed sensor 206 to receive therefrom the results of detection as data to be input, to thereby produce a later-described control signal.

Moreover, the left and right rear wheels 202, 202 are independently suspended by left and right rear suspension units 208, 208, respectivly. Each of the suspension units 208 has a strike characteristic thereof accounting for the compliance steer of the vehicle 200, in such a way that the toeing angle of each of the wheels 202 is caused to vary with the compliance, more particularly a suspension stroke, of a corresponding one of the units 208.

To effectively cope with the stroke characteristic, the left and right suspension units 208, 208 are provided with left and right actuators 209, 209 controlled to give rise to proper characteristic variations by the control signal from the control unit 207, respectively. In other words, the wheel alignment control system 205 is adapted to make the stroke characteristic of each suspension unit 208 varied in accordance with the vehicle speed V, for thereby controlling a dynamic toeing angle of each rear wheel 202, that is, the toeing angle thereof while the vehicle 200 is turning, as will be described in detail hereinbelow.

As shown in FIG. 12, each rear wheel 202 of the vehicle 200 has a normal position (solid line) thereof established with the stroke characteristic of an associated suspension unit 208 controlled for a reference speed, while travelling straight. In this respect, as will be described hereinbelow, in a high-speed travelling, when turning to the left for example, the left and right rear wheels 202, 202 are dynamically controlled to be forced into toe-out and toe-in positions (chain line) 202a, 202a thereof, respectively. As a result, in comparison with a non-dynamic or static toeing control, each rear wheel 202 as steered to turn tends to have a larger slip angle, thus increasing the turning force (a force toward the center of turn) acting thereon, and hence the turning wheel 202 is unlikely to slip in the tangential direction of a turning trace thereof, so that as a whole the vehicle 200 has a steering characteristic biased toward understeer.

The mechanical constitution of the wheel alignment control system 205 will be described in detail below in conjunction with FIGS. 13 and 14.

FIG. 13 is a perspective view from behind of an essential part around the left rear wheel 202, including the left suspension unit 208, of the vehicle 2000, while showing a number of components of the wheel alignment control system 205. In FIG. 13, besides the vehicle speed sensor 206, a manual switch 210 adapted for a manual selection of control mode is connected to the control unit 207 which comprises a later-described microcomputer system mounted on the vehicle, and the control unit 207 is connected to the left actuator 209 as well as to the right actuator (not shown).

The left actuator 209 comprises a servo-motor unit 211 controlled by the control signal from the control unit 207, the servo-motor unit 207 having a reduction gear (not shown) and a rotatable output shaft 212 extending in the transverse direction of a body (not shown) of the vehicle 200, and a worm gear 213 fitted to be fixed on the output shaft 212. The worm gear 213 is meshed with a transversely arranged sector gear 215 fitted to be fixed on a longitudinally extending rotatable support shaft 214 attached to the vehicle body, on which support shaft 214 a swingable support member 216 is integrally fitted at the transversely inner end thereof, the support member 216 having a neutral position thereof extending substantially horizontally in the transversely outward direction from the support shaft 214. The swingable support member 216 is recessed at the transversely outer end (free end) thereof by cutting the middle part thereof to form front and rear bracket portions 216a, 216b spaced apart from each other in the longitudinal direction of the vehicle body, to which bracket portions 216a, 216b a longitudinally arranged mobile shaft 217 is inserted at each end thereof, to serve as a pivot shaft supported therebetween. Accordingly, when the servo-motor unit 211 makes a forward or reverse rotation, the support shaft 214 correspondingly revolves, thus forcing the support member 216 to swing about the shaft 214, causing the free end thereof to be displaced along a vertically stretched arcuate trace.

The left rear suspension unit 208 includes an axle support member 219 having on the left side thereof a rear axle 218 supported thereon, and a shock absorber 221 mounted at the lower end thereof on the top of the axle support ember 219, on which absorber 221 a coil spring 220 is fitted. Moreover, the axle support member 219 has on the front side and rear side thereof front and rear pivot shafts 222, 223 forwardly and rearwardly projected therefrom, respectively. The rear shaft 223 is interconnected with the mobile shaft 217 through a mobile side rear arm 224 having a neutral position thereof extending substantially horizontally in the transverse direction of the vehicle body, on the one hand. The rear arm 224 has at the transversely outer end thereof a bearing portion 225 pivotably fitted on the rear shaft 223 and at the transversely inner end thereof another bearing portion 226 pivotably fitted on the mobile shaft 217. On the other hand, the front shaft 222 is interconnected with a stationary pivot shaft 227 through a stationary side rear arm 228 having a neutral position thereof extending substantially horizontally in the transverse direction of the vehicle body. Also, the rear arm 228 has at the transversely outer end thereof a bearing portion 229 pivotably fitted on the front shaft 222 and at the transversely inner end thereof still another bearing portion 230 pivotably fitted on the stationary shaft 227. The mobile side and stationary side rear arms 224, 228 are dimensioned to be substantially equal to each other in length. The stationary shaft 227 is arranged in parallel with the mobile shaft 217. Designated at reference numeral 233 is a radius rod pivotably connected at the lower end thereof to a pair of brackets 234 formed on the bottom of the axle support member 219.

As shown in FIG. 14, the fastening between the inner end bearing portion 230 of the stationary side rear arm 228 and the stationary shaft 227 is effected by a joint mechanism comprising a collar 231 rotatably fitted on the stationary shaft 227 and a tubular elastic member 232 fixedly fitted on the collar 231, while the bearing portion 230 is fitted on the elastic member 232, whereby the rear arm 228 is effectively supported to be not only swingable about the stationary shaft 227 but also, due to the elasticity of the member 232, pivotable substantially in a horizontal plane as well as in a twisting manner to some extent. Such joint mechanism is also employed for the other bearing portions 225, 226, and 229.

The stroke characteristic of the left rear suspension unit 208 as well as the toeing variation thereby of the left rear wheel 202 will be described in detail hereinbelow, with reference to FIG. 15 as a schematic view in which the front and rear shafts 222, 223 and the mobile and stationary shafts 217, 227 are represented by points, and the mobile side and stationary side rear arms 224, 228, by line segments.

While the vehicle 200 is travelling at a middle speed, the mobile shaft 217 is controlled in level with the control unit 207 so as to be kept at a reference level thereof even with a fixed level of the stationary shaft 227. Under such middle-speed condition, in case the suspension unit 208 has a proper or underformed position thereof, that is, in case a suspension stroke thereof is zero, the axle support member 219 is put in a proper or neutral position thereof, with the rear axle 218 in a horizontal or neutral position 218a thereof, thus holding the front and rear shafts 222, 223 in neutral positions 222a, 223a thereof, thereby putting the rear arms 224, 228 in the aforementioned neutral positions 224a, 228a, that is, making them horizontal. In such neutral compliance state, as can be seen from FIG. 15, the shaft 217, 227 and 222, 223, the rear arms 224, 228, and the rear axle 218 are all lying on a horizontal plane.

Under the middle-speed condition, when the rear wheel 202 is caused to bump or rebound, that is, when it moves upwardly or downwardly from a normal position thereof, then the front and rear shafts 222, 223; the rear arms 224, 228; and the rear axle 218 have up-swung or down-swung positions 222b, 223b; 224b, 228b; and 218b or 222c, 223c; 224c, 228c; and 218c thereof, respectively, while the respective levels of the mobile and stationary shafts 217, 227 are kept unchanged. In such bump or rebound state, as will be easily understood, when imagining a rectangle stretched among the points 217, 222, 223, and 227, a side thereof between the points 222 and 223 and a corresponding side thereto between the points 217 and 227 are kept parallel with each other and are both oriented in the longitudinal direction of the vehicle body. As a result, the rear axle 218, which is rotatably supported by and projecting at right angles from the axle support member 219, is unfailingly directed in the transverse direction of the vehicle body.

Accordingly, under the middle-speed condition in which the mobile shaft 217 is kept at the reference level, the rear axle 218 is transversely directed irrespective of the compliance of the suspension unit 208, so that the toeing angle of the rear wheel 202 will not be changed by the compliance.

While the vehicle 200 is travelling at a high speed, the mobile shaft 217 is moved in a direction of arrow "Up" (upwardly) from the reference level to a lift-up position 370 thereof as shown in FIG. 15. Under such high-speed condition, in the case where the stroke of the suspension unit 208 is zero, that is, in the case of the neutral-compliance state, the rear shaft 223 comes to a position 223u slightly higher than the neutral position 223a, whereas the front shaft 222 as well as the stationary shaft 227 is kept at the same position as under the middle-speed condition. However, on account of the mobile side bearing portion 225 rotatably fitted on the rear shaft 223, when imagining a quadrilateral stretched by the points 370, 223u, 222a, and 227, a side thereof between the points 222a and 223u has substantially the same position as that of the side between the points 222 and 223 under the middle-speed condition, the toeing angle of the rear wheel 202 will not be substantially changed.

Under the high-speed condition, when the axle support member 219 is caused to move up and down, the mobile side rear arm 224 is swung up and down about the mobile shaft 217 as put in the lift-up position 370. Concurrently, the stationary side rear arm 228 is swung up and down about the stationary shaft 227, while drawing the same trace as under the middle-speed condition. As a result, in the case of a rebound state, where the axle support member 219 is downwardly displaced, the rear shaft 223 comes to a transversely inward position 323 relative to the front shaft 222, so that the rear wheel 202 is forced to toe out. In the case of a bump state, where the support member 219 is upwardly displaced, the rear shaft 223 comes to a transversely outer position 423, so that the rear wheel 202 is forced to toe in.

In this respect, under the high-speed condition, when the vehicle 200 is turning, that one of the rear wheels 202 which lies on the far side from the center of turn is forced to bump, and the other one on the near side thereto, to rebound. As a result, even when the mobile shafts 217 of both rear wheels 202 are put in the lift-up position 370, the rear wheel 202 on the far side is forced to toe in, and the rear wheel 202 on the near side, to toe out, thus strengthening the degree of understeer of the vehicle 200.

To the contrary, while the vehicle 200 is travelling at a low speed, the mobile shaft 217 is moved in a direction of arrow "Down" (downwardly) from the reference level. Under such low-low speed condition, the suspension unit 208 has a stroke characteristic contrary to that under the high-speed condition, so that the rear wheel 202 is forced to toe in for rebound and toe out for bump, thus weakening the degree of understeer of the vehicle 200.

As will be understood from the foregoing description, according to this embodiment, in a vehicle equipped with a suspension unit having a stroke characteristic thereof giving rise to variation in the toeing of a rear wheel, a mobile shaft 217 is controlled to be substantially vertically moved in accordance with a speed of the vehicle, such that the mobile shaft 217 moves upwardly when the vehicle speed is high and downwardly when the vehicle speed is low, whereby the degree of understeer of the vehicle is rendered stronger under high-speed conditions and weak under low-speed conditions.

FIG. 16 is a graph describing variations in the toeing of the rear wheel 202 according to the stroke characteristic of the suspension unit 208. In FIG. 16, the solid line curve corresponds to the characteristic at a relatively low value of the vehicle speed V, and the dotted line curve corresponds to that at a relatively high value thereof, whereas the characteristic is controlled to be continuously variable over a region ranging from an extremely low speed to high speed. For example, in the case where the mobile shaft 217 is kept at the reference level, a corresponding curve may well substantially overlap the axis of ordinate of the given graph.

Incidentally, it is desirable that, relative to the foregoing and following descriptions of arrangement and function around the left rear wheel, a mirror-imaged symmetry is unfailingly kept around the right rear wheel.

There will be described hereinbelow the function of the wheel alignment control system 205 in conjunction with FIGS. 17 and 18.

As shown in FIG. 17, the control unit 207, which comprises the microcomputer system mounted on the vehicle 200 as already described, has input therein from the vehicle speed sensor 206 a vehicle speed data signal u3 representing the vehicle speed V. The signal u3 is processed through an operation process A3 to obtain a stroke control data signal d3 representing control data including displacement $\delta$ of the mobile shaft 217 by which the toeing of the rear wheels 202 is controlled to be set, whereas the displacement $\delta$ depends on a given function h of the vehicle speed V as variant, such that $\delta = h(V)$. Incidentally, the displacement $\delta$ is assigned to have a positive value when the mobile shaft 217 is moved upwardly.

The displacement $\delta$ as a dependent variable of the function h has a set of values in one-to-one correspondence with various values of the vehicle speed V, which values of the displacement $\delta$ are empirically predetermined to be optimum and stored as function data in a memory B3, so as to be read out during the process A3.

In this respect, the displacment $\delta$ may be directly computed by processing the vehicle speed data signal u3 through a programmed routine.

FIG. 18 is a plot of the function h describing a relation between the displacement $\delta$ and the vehicle speed V.

As can be seen from FIG. 18, for an arbitrary value of the vehicle speed V, the function h is set as a linear function $h(V) = (k3/Vr3)V - k3$, where k3 is a positive constant, and Vr3 is a reference value of the vehicle speed V. In other words, the function h is so set that, in a domain of V in close vicinity to zero, the displacement $\delta$ approaches a negative value $-k3$, thereby determining the stroke characteristic of the suspension 208 so as to force the rear wheels 202 to toe out for bump and toe in for rebound, and in the remaining region of V, it makes a monotone linear increase with increase in the vehicle speed V, thus passing in the way a point of $\delta = 0$ at the reference value Vr3, that is, putting the mobile shaft 217 at the reference level, then entering a positive displacement region, where the stroke characteristic of the suspension 208 is determined so as to force the rear wheel 202 to toe in for bump and toe out for rebound.

According to this embodiment, for the possibility of such toeing variation in accordance with the vehicle speed V, the vehicle 200 is successfully permitted to have an optimum travelling characteristic over the entire region of the vehicle speed V.

Incidentally, instead of the function h, there may be employed a selectively detemined function in accordance with empirical data of individual vehicles.

Referring again to FIG. 17, the manual switch 210 provided for the control unit 207 comprises five control mode select buttons S3i (where suffix "i" represents an arbitary numeral between and including 1 to 4) and N3 each respectively adapted to, when manually operated to be selected, exclusively turn on. The result of mode selection at the switch 210 is informed in the form of a select operation signal x3 therefrom to the operation process A3 of the control unit 207.

When the button N3 of the manual switch 210 is selected to be on, the control unit 207 is put in an automatic mode in which the stroke control data signal d3 is automatically given in with the vehicle speed V through the function h.

On the other hand, when any of the remaining four buttons S3i of the switch 210 is selected to be on, the control unit 207 enters a manual mode in which the stroke control data signal d3 has a corresponding fixed content irrespective of the vehicle speed V. More particularly, in the manual mode, the displacement $\delta$ becomes fixed at the negative value $-k3$, zero, a first predetermined positive value, or a second predetermined positive value larger than the first positive value, when the button S31, S32, or S34 is selected, respectively. In this respect, as an example, the button S34 may preferably be selected to be on to fix the stroke characteristic of the suspension unit 208 so as to force the rear wheel 202 to toe in for bump and toe out for rebound, in such a case that the vehicle 200 continuously travels at high speeds along a road curved almost over the entire distance, to thereby lighten the burden on the wheel alignment control system 205, particularly that on the servo-motor unit 211.

As shown in FIG. 17, the stroke control data signal d3 as given by the operation process A3 enters an output circuit C3, where it is subjected to necessary processes, such as a digital to analog conversion and an amplification, to be output from the control unit 207 in the form of a control signal y3 to the servo-motor unit 211 of the left actuator 209, as well as to a like unit of the right actuator. At the servo-motor unit 211, an unshown motor is caused to rotate in accordance with the control signal y3, thereby causing the mobile shaft 217 to move vertically, thereby controlling the stroke characteristic of the suspension unit 208.

Incidentally, like the first embodiment, the microcomputer system constituting the control unit 207 comprises a microcomputer provided with necessary integrated circuits (not shown) to exhibit described functions. Respective processes in the computer are executed following a control program software stored in a ROM. In this respect, in place of the computer, there may be employed an electric circuit with compatible functions.

Figure 19:
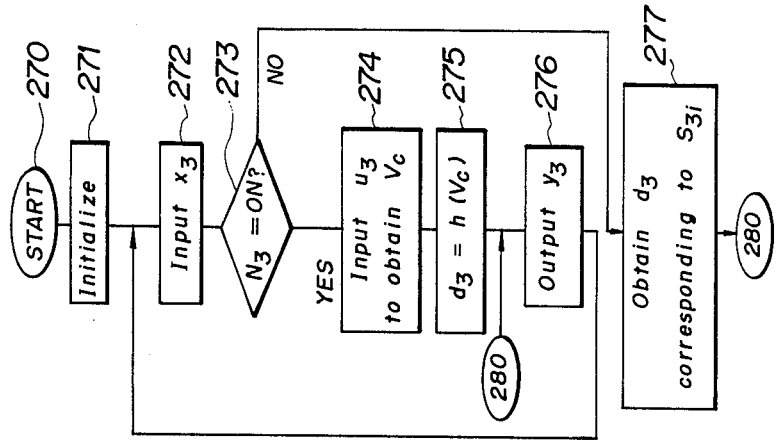
FIG. 19 is a schematic flowchart of a software program for a microcomputer system in the control part of FIG. 17.

FIG. 19 shows a schematic flow chart of a control program stored in the ROM of the computer.

The program is designed to start functioning upon a power-on operation or when reset at a stage 270, and makes the initialization of peripheral interfaces as well as the setting of necessary variations at a stage 271, before the program flow enters a main loop consisting of a plurality of stages 272 to 277.

In the main loop, the select operation signal x3 from the manual switch 210 is input at the first stage 272 and, at a subsequent decision stage 273, a judgment is made according to the signal x3 about whether or not the automatic mode select button N3 is selected to be on.

When the button N3 is on, at a stage 274, the vehicle speed data signal u3 representing a current value Vc of the vehicle speed V is input from the vehicle speed sensor 206, and at a subsequent stage 275, the stroke control data signal d3 is obtained by applying the function h to determine the displacement δ in accordance with the current value Vc of the vehicle speed V.

Then, the program flow enters a stage 276, where the control signal y3 corresponding to the thus obtained content of the data signal d3 is output to the actuators 209, thereby causing the mobile shaft 217 to be displaced to control the stroke characteristic of the suspension unit 208 as circumstances require. Thereafter, the flow again goes to the first stage 272.

However, when, at the decision stage 273, it is judged that the automatic mode select button N3 is not selected to be one, that is, one of the manual mode select buttons S3i is selected, then the program flow enters the stage 277, where the stroke control data signal d3 is obtained by fixing the displacement δ at one of the aforementioned values thereof in accordance with particular selection of the buttons S3i, before the flow goes to the stage 276.

In the foregoing third embodiment also, although it is required to make a comparison between a position of the mobile shaft 217 to be achieved according to the signal y3 and an actual position thereof, such a process is covered with an internal electric circuit (not shown) in the servo-motor unit 211 of the actuator 209.

As will be understood from the foregoing description, according to the third embodiment of the invention, the wheel alignment control system 205 of the vehicle 200 makes the stroke characteristic of the suspension unit 208, of which variation gives rise to a dynamic toeing variation of the rear wheel 202, properly changed to be controlled in accordance with the vehicle speed V as detected, thus permitting the degree of understeer to be made stronger when the vehicle 200 turns while travelling at high speeds, and weak, when the vehicle 200 turns while travelling at low speeds, so that an optimum understeer can be achieved at any value of the vehicle speed V.

It will also be understood that the above-described third embodiment may be applied to a front suspension unit for a front wheel, whereas in such application, contrary to the third embodiment, a mobile shaft may preferably be displaced upwardly under high-speed conditions and downwardly under low-speed conditions.

As a matter of course, the foregoing three embodiments of the present invention may be selectively combined if desired.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

We claim:

1. A wheel alignment control system for a vehicle having a pair of road wheels opposing each other in the transverse direction of said vehicle, for controlling a wheel alignment factor of said wheels while said vehicle is traveling, comprising:
   vehicle speed detecting means for detecting a vehicle speed of said vehicle;
   control means for receiving a speed data signal from said vehicle speed detecting means representing a current value of said vehicle speed; and
   wheel alignment means operatively connected to said control means to receive therefrom a control signal based on said current value of said vehicle speed, for thereby changing and setting said wheel alignment factor in accordance with said current value of said vehicle speed;
   said wheel alignment factor comprises a dynamic toeing quantity of said road wheels.

2. A wheel alignment control system according to claim 1, wherein:
   said vehicle has a pair of suspension units, each respectively supporting one of the road wheels; and
   said wheel alignment means is operatively connected between said control means and said suspension units, the wheel alignment means being adapted to receive a control signal from said control means based on the current value of said vehicle speed for thereby changing and setting a characteristic of said suspension units in accordance with said current value of said vehicle speed, the suspension characteristic affecting toeing angles of said road wheels while the vehicle is turning.

3. A wheel alignment control system according to claim 1, wherein:
   said wheel alignment setting means comprises:
   a pair of suspension units each respectively supporting one of said rear wheels;
   said suspension units each respectively having a stroke characteristic such that, in accordance with a stroke thereof, said toeing quantity of a corresponding one of said rear wheels is varied; and
   actuating means for actuating said stroke characteristic of each of said suspension units;

said control means supplying said actuating means with said control signal for changing and setting said stroke characteristic.

4. A wheel alignment control system according to claim 3, wherein:
either of said suspension units comprises:
a shaft member provided on an axle support member of one of said rear wheels supported by said either of said suspension units and projected therefrom in the fore-to-aft direction thereof;
a stationary side rear arm oriented transversely of said vehicle and pivotably attached at the outer end thereof to the front end of said shaft member and at the inner end thereof to a stationary shaft fixed in a fore-to-aft position thereof to a body of said vehicle: and
a mobile side rear arm oriented transversely of said vehicle and pivotably attached at the outer end thereof to the rear end of said shaft member and at the inner end thereof to a mobile shaft arranged in a fore-to-aft position thereof and adapted to be vertically displaced by said actuating means.

5. A wheel alignment control system according to claim 3, wherein:
said control means supplying said actuating means with said control signal for changing to set said stroke characteristic respectively of said suspension units in accordance with a given function h of said vehicle speed V as said current value represented by said vehicle speed data signal, such that:

$$h(V)=(k3/Vr3)V-k3$$

where k3 is a predetermined value, k3>0, and Vr is a reference speed.

6. A wheel alignment control system according to claim 5, further comprising:
manual switch means having an automatic mode select button and a manual setting button, said buttons being operatively interconnected such that only one of said buttons can be activated at any given time;
said manual switch means supplying said control means with a signal representing an operated state of said buttons; and
said control signal is supplied in accordance with said given function, when said automatic mode select button is on, and in correspondence with said manual setting button, when said manual setting button is on.

7. A wheel alignment control system according to claim 5, wherein:
when said stroke characteristic of each of said suspension units is changed to be set in accordance with said given function, said rear wheels supported by an associated one of said suspension units are forced, when said current value of said vehicle speed is lower than said reference speed, to toe out on a bump side thereof and toe in on a rebound side thereof and, when said current value of said vehicle speed is higher than said reference speed, to toe in on said bump side and toe out on said rebound side.

8. A wheel alignment control system for a vehicle having a pair of road wheels opposing each other in the transverse direction of said vehicle, for controlling a wheel alignment factor of said wheels while said vehicle is traveling, comprising:

vehicle speed detecting means for detecting a vehicle speed of said vehicle;
control means for receiving a speed data signal from said vehicle speed detecting means representing a current value of said vehicle speed; and
wheel alignment means operatively connected to said control means to receive therefrom a control signal based on said current value of said vehicle speed, for thereby changing and setting said wheel alignment factor in accordance with said current value of said vehicle speed;
said wheel alignment factor comprises a camber angle of said road wheels;
said wheel alignment setting means comprises a pair of support members each respectively supporting one of said road wheels, a pair of shock absorbers each having an outer end of a base portion thereof pivotally connected to a corresponding one of said support members, and actuating means connected to said support members for rotatably displacing each of said support members about the base portion of a corresponding shock absorber so as to change said camber angle of said road wheels; and
said control means supplying said actuating means with said control signal for changing and setting said camber angle.

9. A wheel alignment control system according to claim 8, wherein:
said wheel alignment setting means further comprises a pair of rear arms each respectively pivotally connected at an outer end thereof to an inner end of a corresponding one of the base portions of said shock absorbers and at an inner end thereof to a body of said vehicle.

10. A wheel alignment control system according to claim 8, wherein:
said control means is adapted to supply said actuating means with said control signal for setting said camber angle in accordance with a given function f of said vehicle speed V as said current value represented by said vehicle speed data signal, such that:

$$f(V)=k \text{ for } 0 \leq V \leq Vr; \text{ and}$$

$$f(V)=-CV+(k+CVr) \text{ for } Vr<V,$$
where,
k is a predetermined value, $k \geq 0$,
Vr is a reference speed, and
C is a constant.

11. A wheel alignment control system according to claim 10, further comprising:
manual switch means having an automatic mode select button and a manual setting button, said buttons being operatively connected such that only one of said buttons can be activated at any given time;
said manual switch means supplying said control means with a signal representing an operated state of said buttons; and said control signal is supplied in accordance with with said given function, when said automatic mode select button is on, and in correspondence with said manual setting button, when said manual setting button is on.

12. A wheel alignment control system for a vehicle having a pair of road wheels opposing each other in the transverse direction of said vehicle, for controlling a wheel alignment factor of said wheels while said vehicle is traveling, comprising:

vehicle speed detecting means for detecting a vehicle speed of said vehicle;

control means for receiving a speed data signal from said vehicle speed detecting means representing a current value of said vehicle speed; and wheel alignment means operatively connected to said control means to receive therefrom a control signal based on said current value of said vehicle speed, for thereby changing and setting said wheel alignment factor in accordanc with said current value of said vehicle speed;

said wheel alignment factor comprises a static toeing quantity of said rear wheels;

said wheel alignment setting means comprises a pair of support member each respectively supporting one of said road wheels and each provided with a bracket projecting downwardly therefrom, a pair of radius arms oriented longitudinally of said vehicle body, each radius arm being pivotably attached at a rear end thereof to the bracket of a corresponding one of said support members and at the forward end thereof to a mobile shaft arranged transversely of said vehicle body, and activating means for displacing each of said said mobile shafts horizontally so as to change said toeing quantity between said road wheels; and said control means supplying said actuating means with said control signal for changing and setting said toeing quantity.

13. A wheel alignment control system according to claim 12, wherein:

said wheel alignment setting means further comprises a pair of rear arms oriented transversely of said vehicle, each rear arm being pivotally attached at an outer end thereof to a corresponding one of said support members and at an inner end thereof to a pivot shaft fixed in a fore-to-aft position thereof to said body of said vehicle, and elastic members provided between the pivot shafts and the inner ends of said rear arms.

14. A wheel alignment control system according to claim 12, wherein:

said control means supplying said actuating means with said control signal for setting a toeing quantity in accordance with a given function g of said vehicle speed V as said current value represented by said vehicle speed data signal, such that:

$$g(V) = -(k2/Vr2)V + k2$$

where, k2 is a predetermined positive value, and

Vr2 is a reference speed.

15. A wheel alignment control system according to claim 14, further comprising:

manual switch means having an automatic mode select button and a manual setting button, said buttons being operatively connected such that only one of said buttons can be activated at any given time;

said manual switch means supplying said control means with a signal representing an operated state of said buttons; and said control signal is supplied in accordance with said given function, when said automatic mode select button is on, and in correspondence with said manual setting button, when said manual setting button is on.

* * * * *

UNITED STATES PATENT AND TRADEMARK OFFICE
CERTIFICATE OF CORRECTION

PATENT NO. : 4,835,714
DATED : May 30, 1989
INVENTOR(S) : Sano et al.

It is certified that error appears in the above-identified patent and that said Letters Patent is hereby corrected as shown below:

```
Column  2, line 19, change "b" to --b--;
           line 20, change "a" (second occurrence) to --a--;
           line 22, change "b" to --b--;
           line 23, change "a" to --a--;
           line 24, change "b" to --b--;
           line 24, change "a" to --a--;
           line 66, change "tendency roll" to --tendency to roll--.
Column  4, line 16, change "Tha" to --The--.
Column  5, line 42, change "wheesl" to --wheels--.
Column  6, line 60, after "variant" insert --,such that
θ = f(V).  The camber angle θ as a dependent variable--.
Column  7, line 33, change "one" to --on--;
           line 51, change "staight" to --straight--.
Column  9, line 27, change "wiich" to --which--.
Column 11, line 11, change "a-b" to --a-b--;
           line 12, change "-(b-a)" to -- -(b-a);
           line 14, change "a-b" to --a-b--;
           line 15, change "a-b=g(V)." to --a-b=g(V).--;
           line 16, change "a" to --a--;
           line 19, change "b" to --b--;
           line 20, change "a-b" to --a-b--;
           line 24, change "a-b" to --a-b--;
           line 27, change "a-b" to --a-b--;
           line 31, change "a-b" to --a-b--;
           line 39, change "a-b" to --a-b--;
           line 43, change "a-b=0" to --a-b=0--.
Column 12, line 11, change "a-b" to --a-b--;
           line 19, change "a-b" to --a-b--;
           line 59, change "botton" to --button--;
           line 61, change "sped" to --speed--;
           line 64, change "a-b" to --a-b--.
```

UNITED STATES PATENT AND TRADEMARK OFFICE
CERTIFICATE OF CORRECTION

PATENT NO. : 4,835,714
DATED : May 30, 1989
INVENTOR(S) : Sano et al.

It is certified that error appears in the above-identified patent and that said Letters Patent is hereby corrected as shown below:

Column 13, line 6, change "one" (first occurrence) to --on--;
line 9, change "a-b" to --$\underline{a}$-$\underline{b}$--;
line 24, change "a" to --a$\underline{s}$--;
line 46, change "151" to --251--;
line 50, change "106" to --206--;
line 59, change "strike" to --stroke--.
Column 14, line 32, change "2000" to --200--.
Column 15, line 5, change "ember" to --member--.
Column 16, line 1, change "neutral compli-" to --neutral-compli- --;
line 2, change "shaft" to --shafts--.
Column 18, line 41, after "in" insert --accordance--;
line 52, after "S32," insert --S33,--.
Column 19, line 20, change "variations" to --variants--;
line 44, change "one" to --on--.
Column 22, line 60 (claim 11, line 11), delete "with" (second occurrence).
Column 23, line 10 (claim 12, line 15), correct the spelling of --accordance--;
line 23 (claim 12, line 28), change "activating" to --actuating--;
line 24 (claim 12, line 29), delete "said" (second occurrence).

UNITED STATES PATENT AND TRADEMARK OFFICE
CERTIFICATE OF CORRECTION

PATENT NO. : 4,835,714

DATED : May 30, 1989

INVENTOR(S) : Sano et al

It is certified that error appears in the above-identified patent and that said Letters Patent is hereby corrected as shown below:

In the Abstract, line 9, change "of" to --is--;
                line 11, correct the spelling of --suspension--.

Signed and Sealed this

Twenty-fourth Day of April, 1990

Attest:

HARRY F. MANBECK, JR.

*Attesting Officer*      *Commissioner of Patents and Trademarks*